United States Patent [19]

Gumb et al.

[11] Patent Number: 4,776,009
[45] Date of Patent: Oct. 4, 1988

[54] TELEPHONE HANDSET HAVING HOUSINGS ASSEMBLED WITHOUT MECHANICAL FASTENERS

[75] Inventors: Beverley W. Gumb; Richard J. Elgie; John S. Mecher, all of London, Canada

[73] Assignee: Northern Telecom Limited, Montreal, Canada

[21] Appl. No.: 872,064

[22] Filed: Jun. 9, 1986

[51] Int. Cl.⁴ ............................................. H04M 1/03
[52] U.S. Cl. ..................................................... 379/433
[58] Field of Search ......................................... 379/433

[56] References Cited

U.S. PATENT DOCUMENTS

| | | | |
|---|---|---|---|
| 3,564,164 | 2/1971 | Prescott | 379/433 |
| 3,880,253 | 4/1975 | Kuhfus | 181/175 |
| 4,063,049 | 12/1977 | Pipitone | 381/173 |
| 4,130,740 | 12/1978 | Cogan | 379/433 |
| 4,163,875 | 8/1979 | Cogan | 379/433 |
| 4,237,350 | 12/1980 | Ruzic | 379/433 |
| 4,301,343 | 11/1981 | Jonelis | 379/368 |
| 4,317,968 | 3/1982 | Kuhfus | 379/369 |
| 4,319,095 | 3/1982 | Cogan | 379/433 |
| 4,456,794 | 6/1984 | Strömer et al. | 379/433 |
| 4,607,145 | 8/1986 | Ravinet et al. | 381/190 |
| 4,633,044 | 12/1986 | Nakajima | 379/433 |

FOREIGN PATENT DOCUMENTS 166198  1/1986  European Pat. Off. ............ 379/433

Primary Examiner—Jin F. Ng
Assistant Examiner—Danita R. Byrd
Attorney, Agent, or Firm—Foley & Lardner, Schwartz, Jeffery, Schwaab, Mack, Blumenthal & Evans

[57] ABSTRACT

Assembly of handsets is accomplished without the use of mechanical fastenings. Energy directors are provided at the peripheral edges of one of the two housings forming a handset, and the two housings are united by sonic welding. Severe damage can be caused to transducers mounted in the handset by sonic welding, but the use of energy directors directs the sonic energy around the transducers, avoiding damage. The transducers can be held in place by heatstaking positioning members. A rigid assembly which is readily amenable to automated assembly is provided.

1 Claim, 2 Drawing Sheets

TELEPHONE HANDSET HAVING HOUSINGS ASSEMBLED WITHOUT MECHANICAL FASTENERS

This invention relates to a telephone handset which is assembled with no mechanical fasteners holding the handset housings together, and which can have various items within the handset also assembled to the housings without mechanical fasteners.

Conventionally, many handsets have front and back housings, the front housing usually having the transducers, transmitter and receiver, mounted thereon. Other items may be mounted on one or other of the housings. These other items are usually attached by screws passing into hollow bosses. The transducers are also usually attached by screws, by holding members which are held by screws, or by other mechanical devices.

The assembly of the items to housings and the assembly of the housings together requires positioning of parts, and positioning and driving of screws, and as such can require considerable hand labour. Automating the assembly is difficult. The provision of various screws and related items is relatively expensive and is inconvenient.

The present invention provides forthe two housings to be united, or assembled together, by sonic welding. The use of sonic welding can be very difficult as severe damage can be caused to the transducers. In the present invention, energy directors are provided, positioned so as to direct the sonic energy around the transducers, leaving the transducers unaffected. The transducers can be held in position by heatstaking—that is, heating and deforming of members. The receiver is positioned with a plurality of webs extending up from a front surface of the front housing. After positioning of the receiver, the free top edges of the webs are heatstaking over the body of the transmitter, while the receiver is held tghtly down against the housing. The transmitter is held in position by a holding member which is mounted on pillars extending up from the front surface of the front housing. In one example, the free ends of the pillars extend through holes in the holding member, and the end are heatstaking over the holding member while it is held firmly in position.

The invention will be readily understood by the following description of an embodiment, by way of example, in conjunction with the folowing drawings, in which.

Figure 1:
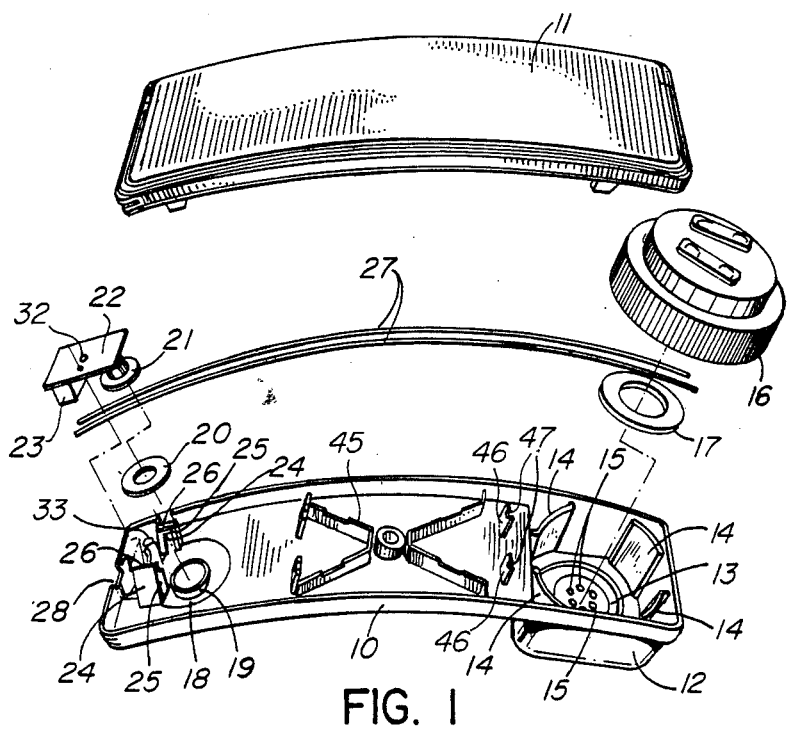
FIG. 1 is an exploded perspective view of a handset, in accordance with the present invention.

As illustrated in FIG. 1, a telephone handset comprises a front housing 10, a rear housing 11, and a tubular shaped extension 12 at one end of the housing. Within the tubular shaped extension, extending up from a front face 13, are four webs 14. Holes 15 in the front face admit audio input to the receiver 16. A gasket 17 sits between the front face of the receiver and the front face 13 of the housing.

At the other end of the front housing 10 is a mounting position 18. Position 18 has a tubular member 19 on which is positioned a gasket 20 and a transmitter 21. The transmitter 21 is mounted on a small circuit board 22, together with a modular jack 23 and other electronic items. Two pillars 24 extend up from the housing, each pillar having a shelf 25 near its upper end with a thin web 26 extending beyond the shelf. The circuit board 22 rests on the shelf.

Two conductors 27 extend between the receiver and transmitter, being soldered to contact pads. The modular jack 23 is aligned with an aperture 28 in the end wall of the housing 10 for admittance of a modular plug. A rear housing, or cover, fits on the front housing, around the periphery.

Figure 2:
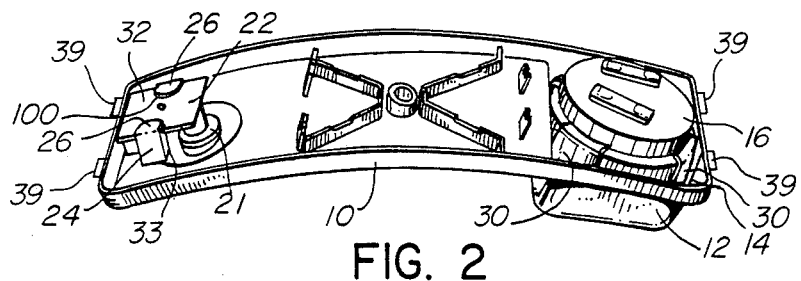
FIG. 2 is a perspective view ofthe front housing with the transducers in position.

FIG. 2 illustrates the front housing 10 with the receiver 16 in position and the free ends of the webs 14 heatstaked, or deformed, over the housing of the receiver, at 30. Also illustrated is the circuit board 22 and transmitter 21 in position. The thin webs 26 of the pillars 24 are heatstaked, or deformed, over the circuit board into hole 100. A small hole 32 in the circuit board enables a screw to be used, screwing into a hollow boss 33 in the front housing (FIG. 1) instead of the heatstaking.

Figure 3:
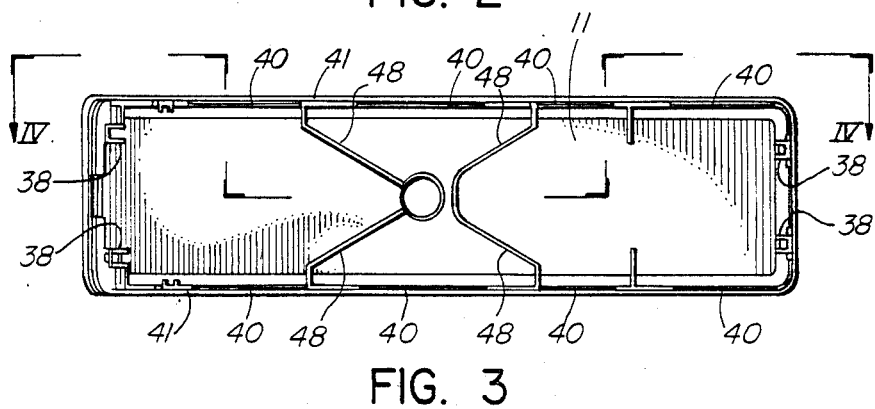
FIG. 3 is a plan view on the front face of the rear housing.
Figure 4:
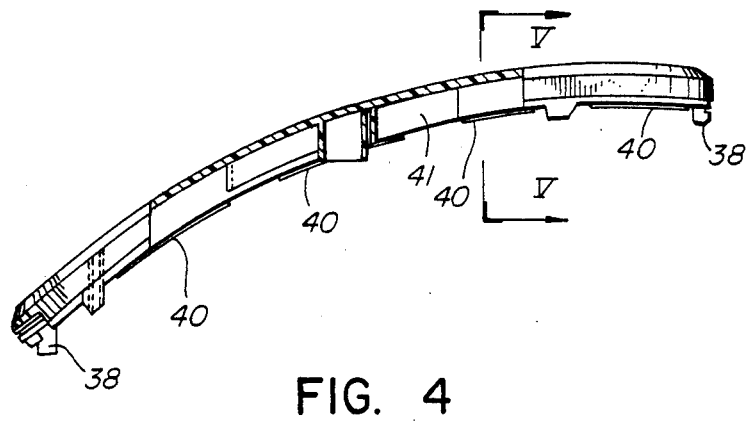
FIG. 4 is part side view and part cross-section on the line IV—IV of FIG. 3.
Figure 5:
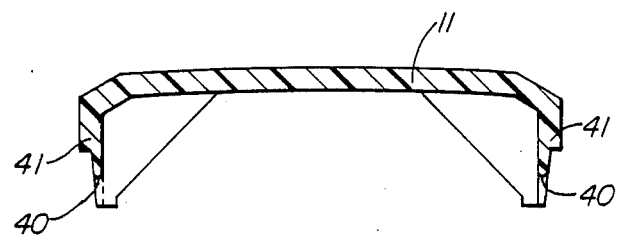
FIG. 5 is a cross-section on the lines V—V of FIG. 4.

FIGS. 3, 4 and 5 illustrate the arrangement of energy directors on the periphery of the rear housing 11. In the particular example, initial assembly of the two housings is obtained by the engagement of hook-shaped members 38 at each end of one housing, in apertured members 39 at each end of the other housing. Energy directors are spaced along each side wall of the housing. If engaging members on the two housings were not provided, energy directors could also be provided on the end wall. As particularly illustrated in FIGS. 3 and 4, energy directors 40 are formed on the edge of each side wall 41. The energy directors are of Vee cross-section, as seen in FIG. 5. The energy directors project below the level of the edges of the side walls and when the front and rear housings are assembled together the energy directors bear firmly against the edges of the side walls of the front housing. On the application of an ultra-sonic vibration to the assembly, the energy directors concentrate the energy of the vibration away from the transducers and fuse to the walls of the front housing. This forms a unified structure having a high level of stiffness. The structure is also very strong against damage due to dropping or banging.

The front housing 10 can be provided with ribs 45 to improve rigidity and small webs 46 can extend from the inner surface to position and support the conductors 27. The webs 46 have small Vee-shaped grooves 47 in the free ends for this purpose. Similarly, ribs 48 can be provided in the rear housing to improve rigidity.

What is claimed is:

1. A telephone handset comprising two housings, a front housing and a rear housing; a transducer mounted in said front housing at each end of said front housing; energy directors extending alongside at least side walls of one of said housings, said housings sonically welded together at said energy directors, a tubular shaped extension extending forward on said front housing at at least one end of said front housing, one of said transducers being mounted in said tubular extension;

a plurality of arcuate webs in said tubular shaped extension, said webs extending from a front face of said tubular shaped extension, said transducer mounted within said webs, free ends of said webs heatstaked over said transducer to retain said transducer in position;

the transducer at the other end of said front housing mounted on a support member, said support member resting on pillars extending from a front surface of said front housing, ends of said pillars extending through holes in said support member, and being heatstaked over to retain said support members in position.

* * * * *